(12) United States Patent
Landes et al.

(10) Patent No.: US 7,509,197 B2
(45) Date of Patent: Mar. 24, 2009

(54) RETARDING SYSTEM IMPLEMENTING TRANSMISSION CONTROL

(75) Inventors: James W. Landes, East Peoria, IL (US); Mark E. Rettig, Peoria, IL (US); Ryan E. Graham, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 577 days.

(21) Appl. No.: 11/045,297

(22) Filed: Jan. 31, 2005

(65) Prior Publication Data

US 2006/0173599 A1    Aug. 3, 2006

(51) Int. Cl.
| | |
|---|---|
| *G06F 17/00* | (2006.01) |
| *G06F 19/00* | (2006.01) |
| *B60W 10/04* | (2006.01) |
| *B60W 10/10* | (2006.01) |
| *G06F 7/00* | (2006.01) |
| *F16H 59/60* | (2006.01) |

(52) U.S. Cl. .......................... 701/50; 701/54; 701/53; 701/93; 477/37; 477/109; 477/115; 477/98; 477/120; 477/156; 477/186; 477/119; 477/94; 74/625; 74/114; 74/335; 74/473.11; 74/473.21

(58) Field of Classification Search .................. 701/50, 701/71, 51, 54, 53, 93; 477/94, 37, 109, 477/115, 906, 98, 120, 156, 186, 119, 182, 477/102; 74/625, 114, 335, 473.11, 473.21, 74/490.12, 490.11

See application file for complete search history.

(56) References Cited

U.S. PATENT DOCUMENTS

| | | | | |
|---|---|---|---|---|
| 3,931,870 | A * | 1/1976 | Memmer ..................... | 188/296 |
| 4,050,556 | A * | 9/1977 | Forster et al. ................ | 477/182 |
| 4,753,134 | A * | 6/1988 | Hayasaki .................... | 477/119 |
| 4,916,979 | A * | 4/1990 | Irwin .......................... | 477/94 |
| 5,295,415 | A * | 3/1994 | Abe et al. .................... | 477/102 |
| 5,587,905 | A * | 12/1996 | Yesel et al. ................... | 701/53 |
| 5,754,968 | A | 5/1998 | Hedström | |
| 5,890,993 | A | 4/1999 | Horiguchi et al. | |
| 6,076,622 | A * | 6/2000 | Chakraborty et al. ........ | 180/169 |
| 6,152,853 | A * | 11/2000 | Banks, III .................... | 477/186 |
| 6,212,458 | B1 | 4/2001 | Walenty et al. | |
| 6,216,073 | B1 * | 4/2001 | Horiguchi et al. ............. | 701/51 |
| 6,231,474 | B1 * | 5/2001 | Hawarden et al. ............. | 477/94 |
| 6,240,356 | B1 * | 5/2001 | Lapke ......................... | 701/93 |

(Continued)

*Primary Examiner*—Khoi Tran
*Assistant Examiner*—Ian Jen
(74) *Attorney, Agent, or Firm*—Finnegan, Henderson, Farabow, Garrett & Dunner

(57) ABSTRACT

A retarding system for a work machine having a power source, a transmission, and a manually operated braking mechanism is disclosed. The retarding system has an engine retarder associated with the power source and a controller in communication with the transmission, the manually operated braking mechanism, and the engine retarder. The controller is configured to determine a deceleration rate of the work machine and compare the deceleration rate of the work machine to a predetermined threshold rate. The controller is also configured to determined if the manually operated braking mechanism is active and to cause the transmission to downshift if the deceleration rate is less than the predetermined threshold rate and the manually operated braking mechanism is determined to be active. The controller is further configured to prevent the transmission from downshifting if the deceleration rate is less than the predetermined threshold rate and the manually operated braking mechanism is determined to be inactive.

21 Claims, 3 Drawing Sheets

U.S. PATENT DOCUMENTS

| | | | |
|---|---|---|---|
| 6,249,733 B1 * | 6/2001 | Smith | 701/50 |
| 6,349,253 B1 | 2/2002 | Bellinger | |
| 6,409,629 B1 * | 6/2002 | Davis | 477/98 |
| 6,434,466 B1 * | 8/2002 | Robichaux et al. | 701/54 |
| 6,461,272 B1 * | 10/2002 | Boardman et al. | 477/91 |
| 6,577,938 B1 | 6/2003 | Bellinger et al. | |
| 7,014,592 B2 * | 3/2006 | Wiethe et al. | 477/120 |
| 7,162,996 B2 * | 1/2007 | Yang | 123/321 |

* cited by examiner ured to rotatably drive traction device 18 via a shaft 22,
RETARDING SYSTEM IMPLEMENTING TRANSMISSION CONTROL

TECHNICAL FIELD

The present disclosure relates generally to a retarding system and, more particularly, to a retarding system that implements transmission control.

BACKGROUND

A work machine such as, for example, an off-highway truck, may be large and heavy, making it difficult to decelerate. For example, an off-highway truck, such as the 797 produced by Caterpillar Inc. has a gross machine operating weight in excess of 687 tons. When operating a work machine this heavy, it is important to control its speed, especially when the work machine is traveling down an incline.

In order to maintain proper speed control over such a large and heavy work machine, the work machine may be outfitted with a retarding system that implements engine retarding and automatic transmission control. One such system is described in U.S. Pat. No. 6,249,733 (the '733 patent) to Smith. The '733 patent teaches an engine control system for automatically controlling an engine retarder and providing signals to control a transmission on a vehicle. If engine speed exceeds a predetermined engine speed level, the engine retarder is actuated to begin engine braking. When the vehicle reaches an appropriate speed, the transmission is automatically downshifted, thereby providing additional braking.

Although the engine control system of the '733 patent may sufficiently control the travel speed of a vehicle, it may create less than optimum situtations for the operator of the vehicle. For example, there may be instances when engine braking is desired to slow the vehicle, but downshifting is undesirable. When a downshift is automatically implemented during these situations, it may be necessary for the operator to manually adjust or readjust operation of the vehicle to account for the undesired downshift. Continued adjusting or readjusting of vehicle operation could result in efficiency and production losses of the vehicle.

The disclosed retarding system is directed to overcoming one or more of the problems set forth above.

SUMMARY OF THE INVENTION

In one aspect, the present disclosure is directed to a retarding system for a work machine having a power source, a transmission, and a manually operated braking mechanism. The retarding system includes an engine retarder associated with the power source, and a controller in communication with the manually operated braking mechanism, the engine retarder, and the transmission. The controller is configured to determine a deceleration rate of the work machine and compare the deceleration rate of the work machine to a predetermined threshold rate. The controller is also configured to determine if the manually operated braking mechanism is active and to cause the transmission to downshift if the deceleration rate is less than the predetermined threshold rate and the manually operated braking mechanism is determined to be active. The controller is further configured to prevent the transmission from downshifting if the deceleration rate is less than the predetermined threshold rate and the manually operated braking mechanism is determined to be inactive.

In yet another aspect, the present disclosure is directed to a method of decelerating a work machine. The method includes determining a deceleration rate of the work machine and comparing the deceleration rate to a predetermined threshold rate. The method also includes determining if a manually operated braking mechanism is active. The method further includes downshifting a transmission of the work machine when the deceleration rate is less than the predetermined threshold rate and the manually operated braking mechanism is determined to be active, and preventing downshifting of the transmission when the deceleration rate is less than the predetermined threshold rate and the manually operated braking mechanism is determined to be inactive.

DETAILED DESCRIPTION

Figure 1:
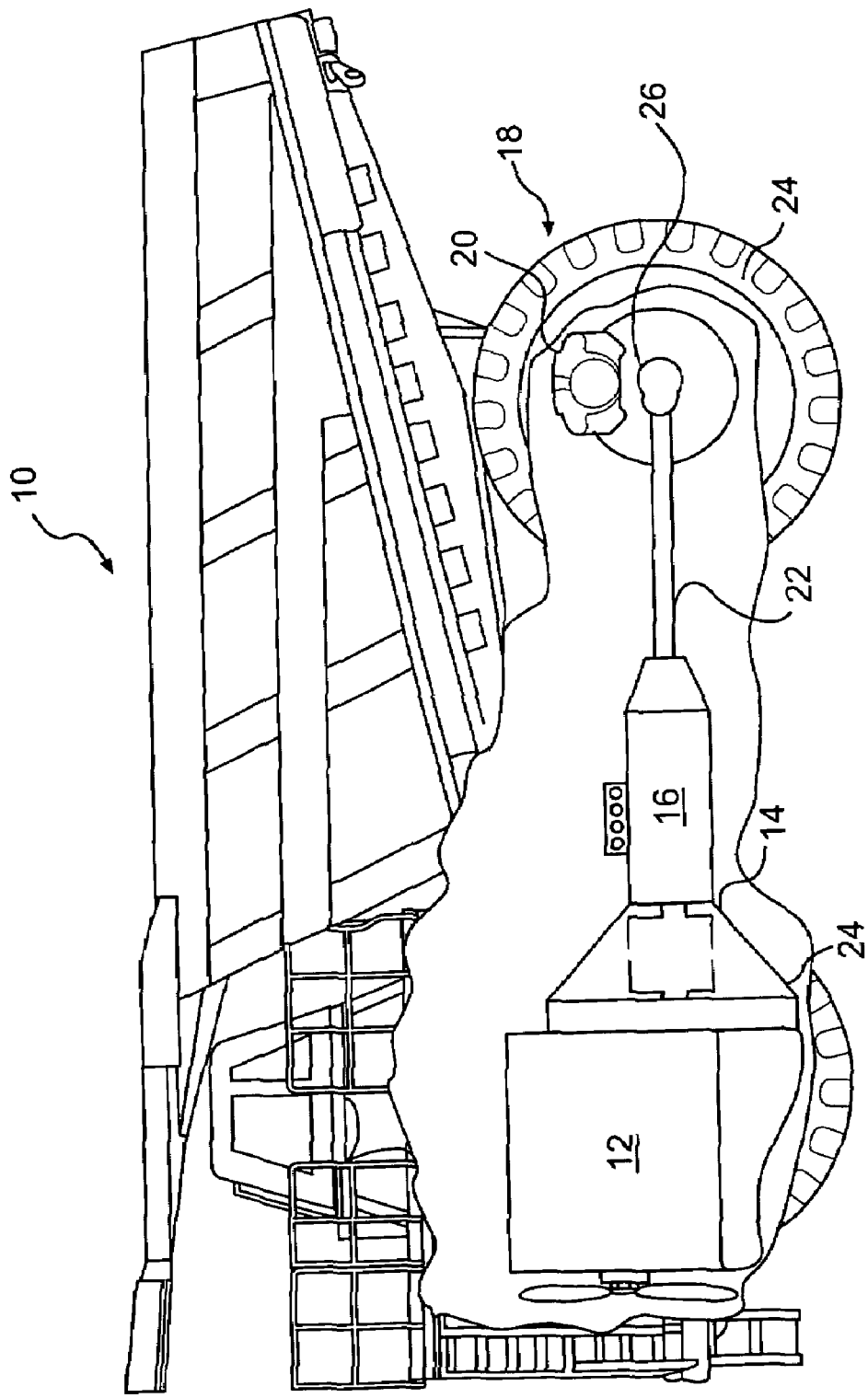
FIG. 1 is a diagrammatic illustration of an exemplary disclosed work machine.

FIG. 1 illustrates an exemplary work machine 10. Work machine 10 may be a mobile machine that performs some type of operation associated with an industry such as mining, construction, farming, transportation, or any other industry known in the art. For example, work machine 10 may be an earth moving machine such as an off-highway truck. Work machine 10 may alternatively embody an on-highway truck, a passenger vehicle, or any other suitable operation-performing work machine. Work machine 10 may include a power source 12, a torque converter 14, a transmission 16 operably connected to a traction device 18, and a brake mechanism 20.

Power source 12 may be configured to produce a power output and may include an internal combustion engine. For example, power source 12 may include a diesel engine, a gasoline engine, a gaseous fuel-powered engine, or any other engine apparent to one skilled in the art.

Torque converter 14 may embody a hydraulic device configured to couple transmission 16 to power source 12. Torque converter 14 may allow power source 12 to rotate somewhat independently of transmission 16. It is contemplated that torque converter 14 may alternatively be embodied in a non-hydraulic device such as, for example, a mechanical diaphragm clutch.

Transmission 16 may include numerous components that interact to transmit power from power source 12 to traction device 18. In particular, transmission 16 may be a multi-speed bidirectional mechanical transmission having a neutral gear ratio, a plurality of forward gear ratios, a reverse gear ratio, and one or more clutches (not shown). The clutches may be selectively actuated to engage predetermined combinations of gears (not shown) that produce a desired output gear ratio. It is contemplated that transmission 16 may be an automatic-type transmission, with shifting based on a power source speed, a maximum selected gear ratio, and a shift map. The output of transmission 16 may be connected to and configured to rotatably drive traction device 18 via a shaft 22, thereby propelling work machine 10.

Traction device 18 may include wheels 24 located on each side of work machine 10 (only one side shown). Alternately, traction device 18 may include tracks, belts, or other driven traction devices. Traction device 18 may be driven by transmission 16 to rotate in accordance with an output rotation of transmission 16.

Figure 2:
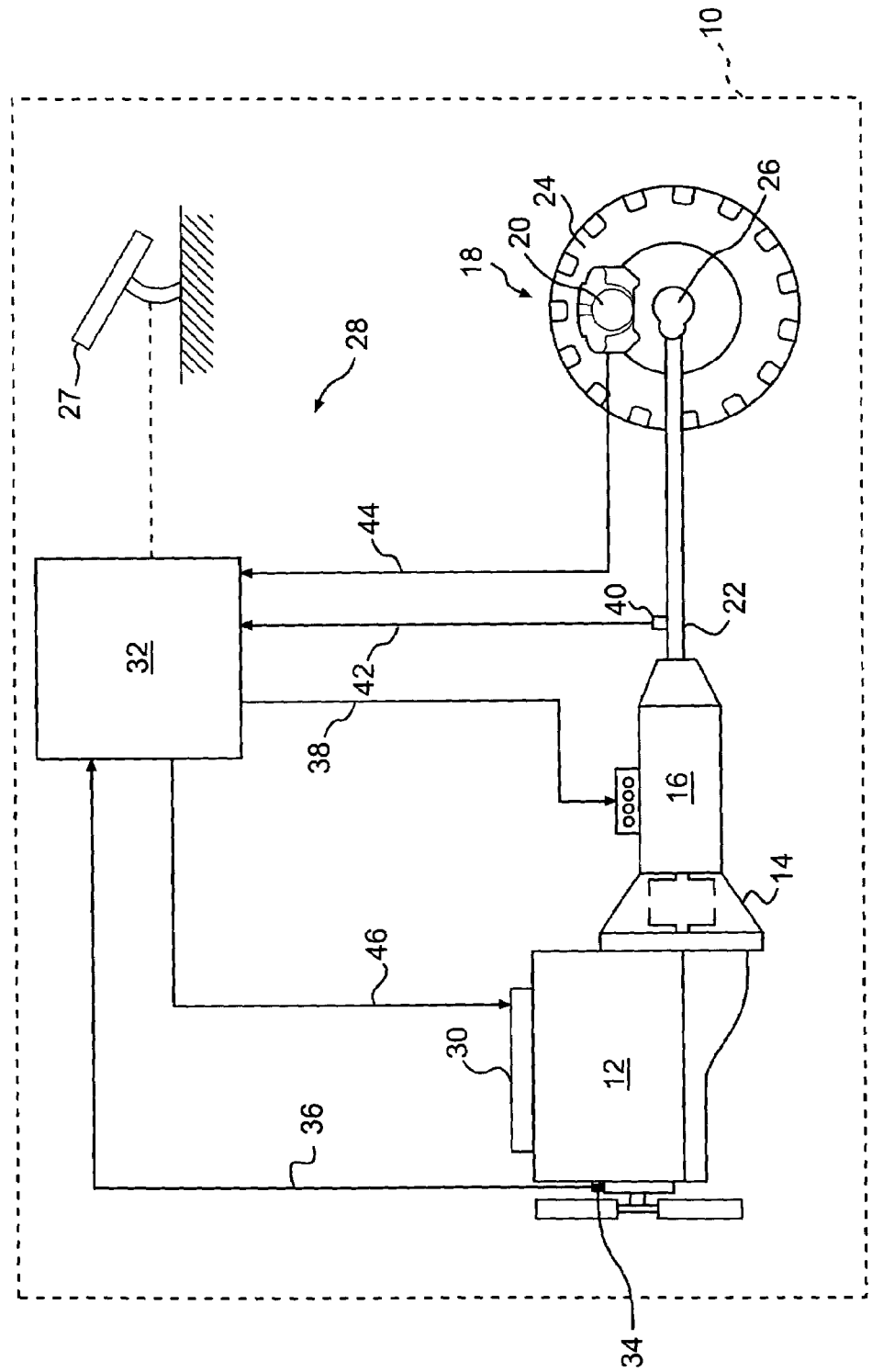
FIG. 2 is a diagrammatic illustration of an exemplary disclosed retarding system for the work machine of FIG. 1.

Brake mechanism 20 may be configured to retard the motion of work machine 10 and may be operably connected to each wheel 24 of work machine 10. In one embodiment, brake mechanism 20 is a hydraulic pressure-actuated wheel brake such as, for example a disk brake or a drum brake disposed intermediate wheel 24 and a drive assembly 26. As illustrated in FIG. 2, brake mechanism 20 may be manually operated using a brake pedal 27, which in turn directs pressurized fluid to brake mechanism 20. A degree of brake pedal actuation may proportionally control a pressure of the fluid supplied to brake mechanism 20. It is contemplated that brake mechanism 20 may alternatively be pneumatically actuated, mechanically actuated, or actuated in any other manner known in the art. Brake mechanism 20 may be determined to be active if a pressure of the fluid supplied to brake mechanism 20 is greater than a predetermined pressure and/or if an angle of brake pedal actuation exceeds a predetermined angle.

A brake sensor (not shown) may be provided for indicating whenever brake mechanism 20 is actively retarding the motion of work machine 10. The brake sensor may be embodied in any device such as, for example, a switch or a pressure sensor capable of producing an electric signal indicating that a braking operation is being performed. For example, a switch may indicate a position of brake pedal 27, while a pressure sensor may indicate a pressure of a hydraulic fluid supplied to brake mechanism 20.

As also illustrated in FIG. 2, work machine 10 may further include a retarding system 28 having components that cooperate with brake mechanism 20 and transmission 16 to decelerate work machine 10. In particular, retarding system 28 may include an engine retarder 30 and a controller 32.

Engine retarder 30 may embody any device that selectively opens the exhaust valves (not shown) of power source 12 near the top dead center (TDC) position of a compression stroke. By opening the exhaust valves near top dead center of the compression stroke, highly-compressed air may be vented to the atmosphere, thereby removing stored energy from the associated pistons of power source 12. On the ensuing downward power stroke, essentially no energy is returned to the piston (and to the traction device 24), resulting in a deceleration of work machine 10. It is contemplated that engine retarder 30 may be hydraulically operated, mechanically operated, electrically operated, pneumatically operated, or operated in any other suitable manner.

Controller 32 may embody a single microprocessor or multiple microprocessors that include a means for controlling an operation of retarding system 28. Numerous commercially available microprocessors can be configured to perform the functions of controller 32. It should be appreciated that controller 32 could readily embody a general work machine microprocessor capable of controlling numerous work machine functions. Various other known circuits may be associated with controller 32, including power supply circuitry, signal-conditioning circuitry, solenoid driver circuitry, communication circuitry, and other appropriate circuitry.

Controller 32 may be in communication with various components of work machine 10. In particular, controller 32 may be in communication with a power source speed sensor 34 via a communication line 36 to receive an indication of a rotational speed of power source 12, with transmission 16 via a communication line 38 to affect downshifting of transmission 16, with a work machine travel speed sensor 40 via a communication line 42 to receive an indication of a travel speed of work machine 10, with brake mechanism 20 via a communication line 44 to determine whether brake mechanism 20 is active or inactive, and with engine retarder 30 via a communication line 46. It is contemplated that controller 32 may alternatively be in communication with brake pedal 27 instead of brake mechanism 20, if desired, to thereby determine if brake mechanism 20 is active or inactive. Power source speed sensor 34 may be embodied in a magnetic pick up sensor configured to sense a power source speed and to produce a signal corresponding to the rotational speed of power source 12. Similar to power source speed sensor 34, work machine travel speed sensor 40 may also be embodied in a magnetic pick up sensor, but configured to sense a work machine travel speed and to produce a travel speed signal. Work machine travel speed sensor 40 may be disposed on shaft 22, on a component of drive assembly 26, or on any other suitable component of work machine 10, and configured to produce a signal corresponding to the travel speed of work machine 10.

Controller 32 may be configured to initiate a downshift of transmission 16 to increase the retarding effect of engine retarder 30. In particular, controller 32 may determine that engine retarder 30 is active and may determine a deceleration rate of work machine 10 resulting from the operation of engine retarder 30. If the deceleration rate of work machine 10 is less than a minimum threshold deceleration rate and if brake mechanism 20 is active (e.g., operation of brake mechanism 20 has been initiated by the work machine operator), controller 32 may actuate the clutches of transmission 16 to selectively engage a predetermined combination of gears, thereby effecting the desired downshift. The deceleration rate of work machine 10 may be determined by monitoring the rotational speed of power source 12 and comparing this rotational speed with the current output ratio of transmission 16, or may alternatively be monitored directly via work machine travel speed sensor 40.

Controller 32 may be further configured to prevent a downshift of transmission 16 when the downshift is undesired. In particular, controller 32 may determine that engine retarder 30 is active and determine a deceleration rate of work machine 10 resulting from the operation of engine retarder 30. If the deceleration rate of work machine 10 is less than a minimum threshold deceleration rate and if brake mechanism 20 is inactive (e.g., operation of brake mechanism 20 has not been initiated by the work machine operator), controller 32 may prevent the clutches of transmission 16 from downshifting, even though a deceleration rate of work machine 10 may indicate a need to downshift.

Figure 3:
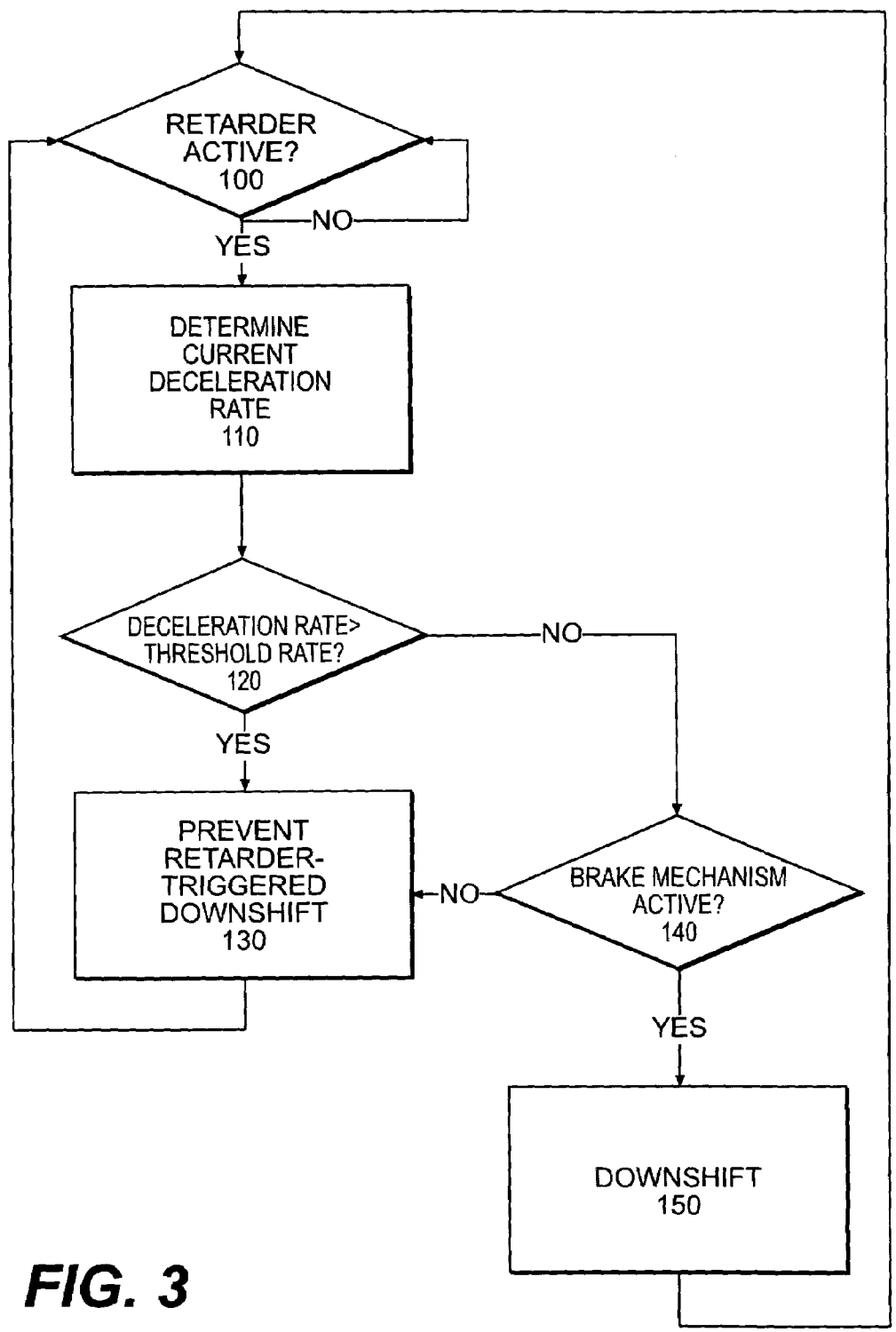
FIG. 3 is a flow chart depicting an exemplary method of operating the retarding system of FIG. 2.

FIG. 3 illustrates an exemplary operation of retarding system 28. FIG. 3 will be described in detail below.

INDUSTRIAL APPLICABILITY

The disclosed retarding system may be applicable to any work machine where automatic downshifting during periods of engine braking may be undesirable. The disclosed retarding system may prevent downshifting during periods of engine braking if operation an associated wheel brake has not been initiated. Operation of retarding system 28 will now be explained.

Referring to FIG. 3, when it has been determined that retarding system 28 is in operation (step 100), controller 32 may determine the current deceleration rate of work machine 10 (step 110) and compare this deceleration rate with a predetermined minimum threshold deceleration rate (step 120) that results in sufficient braking of work machine 10. If the current deceleration rate of work machine 10 is determined to be greater than the predetermined minimum threshold deceleration rate, work machine 10 may be braking at a satisfactory rate and automatic downshifting of transmission 16 may be prevented (step 130). However, if the current deceleration rate of work machine 10 is determined to be less than the predetermined minimum threshold deceleration rate, controller 32 may then determine if the work machine operator has activated brake mechanism 20 (step 140).

If controller 32 has determined that the work machine operator has activated brake mechanism 20 and the current deceleration rate is insufficient (less than the minimum predetermined threshold rate), controller 32 may determine that additional retarding is necessary and enable retarder-triggered downshifting of transmission 16 (150). It is contemplated that, although retarder-triggered downshifting has been enabled, transmission 16 may not downshift because of additional transmission control algorithms such as, for example, an overspeed protection algorithm. If controller 32 determines that the work machine operator has not yet activated brake mechanism 20, downshifting of transmission 16 may be prevented by controller 32, even if controller 32 has determined that the current deceleration rate is insufficient. In this manner, undesired down shifting during a retarding process may be prevented.

Several advantages of retarding system 28 may be realized over the prior art. In particular, because controller 32 only implements downshifting of transmission 16 after it has determined that the work machine operator has activated brake mechanisms 20, undesired nuisance downshifting may be avoided. Fewer occurrences of nuisance downshifting may result in less associated adjusting or readjusting of work machine operation and could increase the efficiency and production of work machine 10.

It will be apparent to those skilled in the art that various modifications and variations can be made to the retarding system of the present disclosure. Other embodiments of the retarding system will be apparent to those skilled in the art from consideration of the specification and practice of the retarding system disclosed herein. It is intended that the specification and examples be considered as exemplary only, with a true scope of the disclosure being indicated by the following claims and their equivalents.

What is claimed is:

1. A retarding system for a machine having a power source, a transmission, and a manually operated braking mechanism, comprising:
    an engine retarder associated with the power source; and
    a controller in communication with the transmission, the manually operated braking mechanism, and the engine retarder, the controller being configured to:
        determine a deceleration rate of the machine and compare the deceleration rate of the machine to a predetermined threshold rate;
        determine if the manually operated braking mechanism is active;
        cause the transmission to downshift if the deceleration rate is less than the predetermined threshold rate and the manually operated braking mechanism is determined to be active; and
        prevent the transmission from downshifting if the deceleration rate is less than the predetermined threshold rate and the manually operated braking mechanism is determined to be inactive.

2. The retarding system of claim 1, wherein the controller is further configured to prevent the transmission from downshifting if the deceleration rate is greater than the predetermined threshold rate.

3. The retarding system of claim 1, wherein the controller is in further communication with the power source and the deceleration rate is determined by monitoring a speed of the power source.

4. The retarding system of claim 1, further including a machine travel speed sensor, wherein the controller is in further communication with the machine travel speed sensor and the deceleration rate is determined by monitoring a travel speed of the machine.

5. The retarding system of claim 1, wherein the manually operated braking mechanism includes a wheel brake actuated via an operator control mechanism.

6. The retarding system of claim 5, wherein the wheel brake is hydraulically actuated and the manually operated braking mechanism is determined to be active when a pressure of fluid supplied to the wheel brake is above a predetermined value and determined to be inactive when the pressure of the fluid is below the predetermined value.

7. The retarding system of claim 5, wherein the control system is configured to detect a position of the operator control mechanism and establish a first position, and the manually operated braking mechanism is determined to be inactive when the operator control mechanism is in the first position and determined to be active when the operator control mechanism is away from the first position.

8. A method of decelerating a machine, comprising:
    determining a deceleration rate of the machine;
    comparing the deceleration rate to a predetermined threshold rate;
    determining if a manually operated braking mechanism is active;
    downshifting a transmission of the machine when the deceleration rate is less than the predetermined threshold rate and the manually operated braking mechanism is determined to be active; and
    preventing downshifting of the transmission when the deceleration rate is less than the predetermined threshold rate and the manually operated braking mechanism is determined to be inactive.

9. The method of claim 8, further including preventing the transmission from downshifting if the deceleration rate is greater than the predetermined threshold rate.

10. The method of claim 8, wherein determining a deceleration rate includes monitoring a speed of the power source.

11. The method of claim 8, wherein determining a deceleration rate includes monitoring a travel speed of the machine.

12. The method of claim 8, wherein the manually operated braking mechanism includes a wheel brake actuated via an operator control mechanism.

13. The method of claim 12, wherein:
    the wheel brake is hydraulically actuated;
    the method further includes monitoring a pressure of a fluid supplied to the hydraulically actuated wheel brake; and
    the manually operated braking mechanism is determined to be active when the pressure of the fluid is above a predetermined value and to be inactive when the pressure of the fluid is below the predetermined value.

14. The method of claim 12, further including monitoring a position of the operator control mechanism and establishing a first position, wherein the manually operated braking mechanism is determined to be inactive when the operator control device is in the first position and to be active when the operator control device is away from the first position.

15. A machine, comprising:
    a power source configured to produce a power output;
    at least one traction device;
    a transmission operably connected to the power source and configured to drive the at least one traction device;
    a torque converter operably coupling the transmission to the power source;

a manually operated braking mechanism associated with the at least one traction device; and a retarding system configured to decelerate the machine, the retarding system including:

an engine retarder associated with the power source; and a controller in communication with the manually operated braking mechanism, the engine retarder, and the transmission, the controller being configured to:

determine a deceleration rate of the machine and compare the deceleration rate of the machine to a predetermined threshold rate;

determine if the manually operated braking mechanism is active;

cause the transmission to downshift if the deceleration rate is less than the predetermined threshold rate and the manually operated braking mechanism is determined to be active; and prevent the transmission from downshifting if the deceleration rate is less than the predetermined threshold rate and the manually operated braking mechanism is determined to be inactive.

16. The machine of claim 15, wherein the controller is further configured to prevent the transmission from downshifting if the deceleration rate is greater than the predetermined threshold rate.

17. The machine of claim 15, wherein the controller is in further communication with the power source and the deceleration rate is determined by monitoring a speed of the power source.

18. The machine of claim 15, further including a travel speed sensor, wherein the controller is in further communication with the travel speed sensor and the deceleration rate is determined by monitoring a travel speed of the machine.

19. The machine of claim 15, wherein the manually operated braking mechanism includes a wheel brake manually actuated via an operator control mechanism.

20. The machine of claim 19, wherein the wheel brake is hydraulically actuated and the manually operated braking mechanism is determined to be active when the pressure of the fluid is above a predetermined value and determined to be inactive when the pressure of the fluid is below the predetermined value.

21. The machine of claim 19, wherein the control system is configured to detect a position of the operator control mechanism and establish a first position, and the manually operated braking mechanism is determined to be inactive when the operator control mechanism is in the first position and determined to be active when the operator control mechanism is away from the first position.

* * * * *